E. A. STUBLER.
PUMPING VALVE MECHANISM.
APPLICATION FILED APR. 17, 1907.
919,792.
Patented Apr. 27, 1909.
2 SHEETS—SHEET 1.
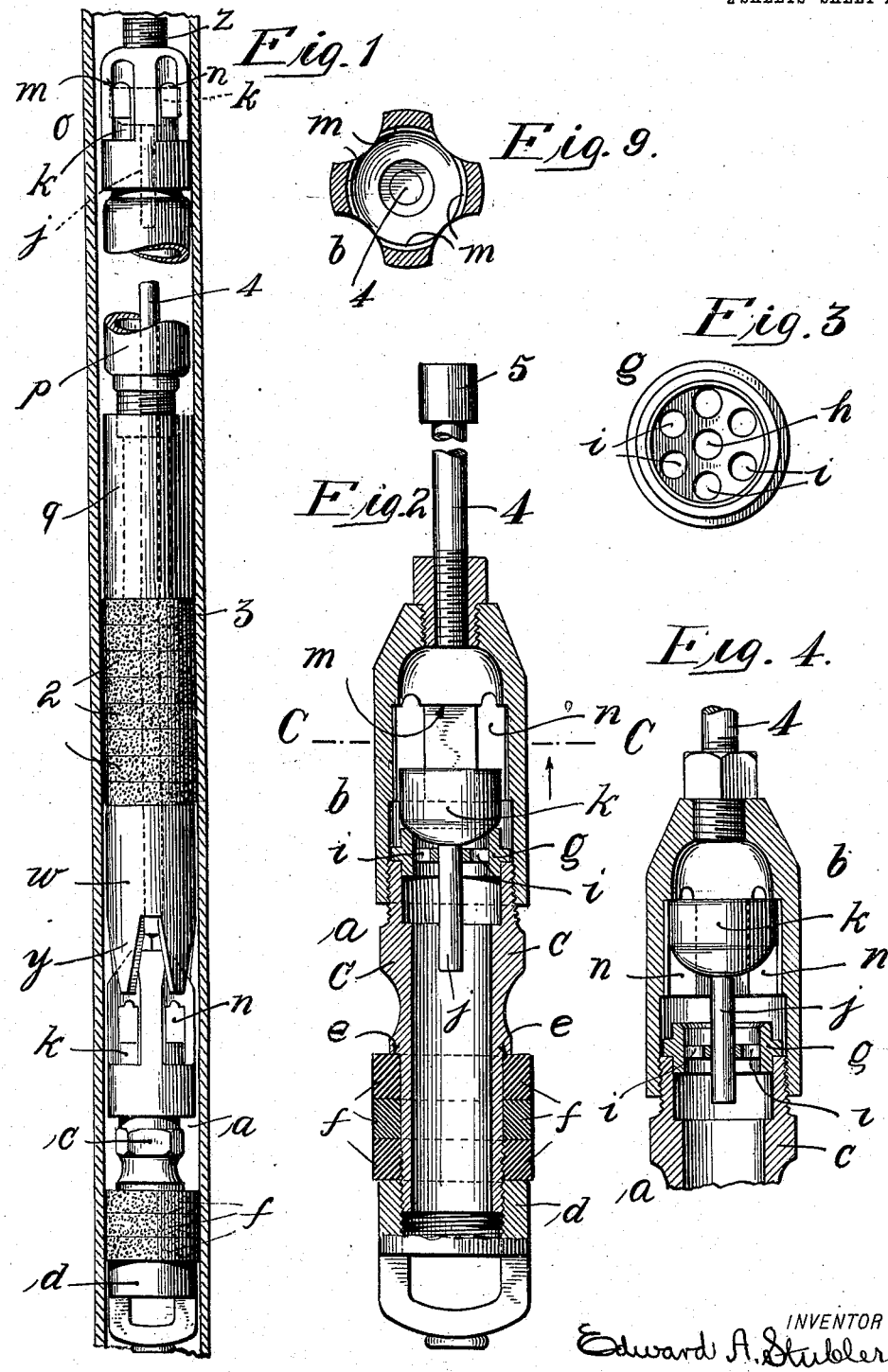
INVENTOR
Edward A. Stubler
BY
James Hamilton
ATTORNEY

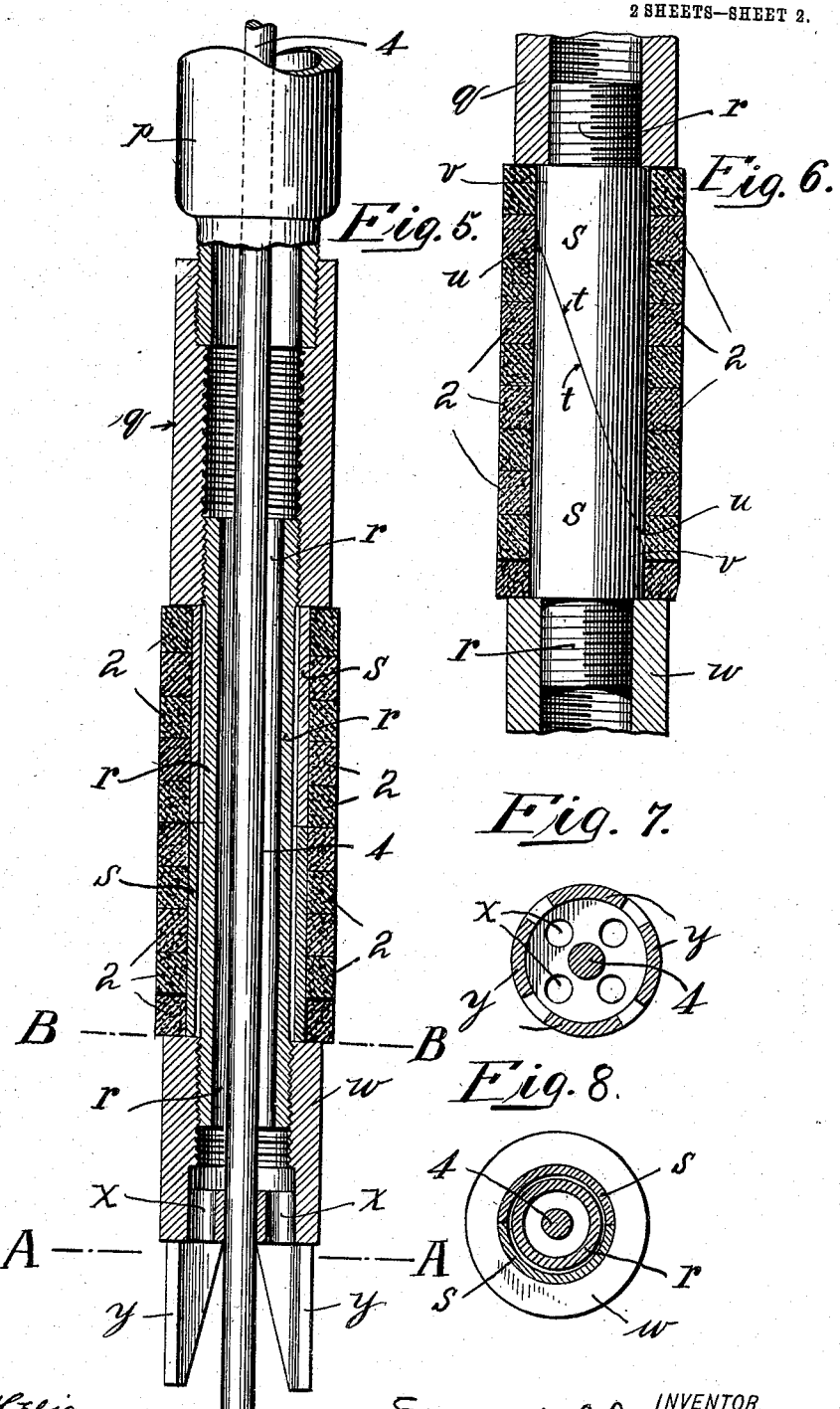

UNITED STATES PATENT OFFICE.

EDWARD A. STUBLER, OF OIL CITY, PENNSYLVANIA.

PUMPING VALVE MECHANISM.

No. 919,792.        Specification of Letters Patent.        Patented April 27, 1909.

Application filed April 17, 1907. Serial No. 368,766.

*To all whom it may concern:*

Be it known that I, EDWARD A. STUBLER, a citizen of the United States, residing at Oil City, in the county of Venango and State of Pennsylvania, have invented certain new and useful Improvements in Pumping Valve Mechanism, of which the following is a specification, reference being had to the accompanying drawings.

My invention relates to valve mechanism used for pumping machinery; and particularly to valve mechanism used for pumping machinery adapted for pumping oil from oil wells.

An object of my invention is to provide a valve mechanism adapted for use with oil pumping machinery which will prove simple in construction, efficient in operation and easily repaired in place.

Heretofore, so far as known to me, the valves for oil pumping machinery have been usually equipped with a ball valve. Such a valve has been found liable to stick at the top of the valve casing in the paraffin and other sticky material which collects there in the ordinary working of the pump. Further, when the valve sticks in the paraffin, the air pressure upon the base of the ball holds it from its seat.

In carrying out my invention, I provide a valve having a flattened top and form the valve casing with shoulders, against which the flattened top of the valve strikes at the upper limit of its travel. Further, the valve casing is formed with grooves, which extend above these shoulders and prevent the formation of a vacuum. Further, in ball valves, the valve becomes leaky through the uneven wear of the ball.

In carrying out my invention, I provide my valve with a guide-pin and the valve seat with an aperture through which the guide-pin passes, thereby insuring uniform wear of the valve.

In order to prevent foreign matter from gaining access to the barrel of the valve, I provide the barrel with a strainer.

When the packing of the plunger becomes worn, it has heretofore been necessary to "pull" the valve. This is a laborious and expensive operation. In my new valve mechanism, means are provided whereby the plunger packing may be expanded with the plunger in place, thereby avoiding this operation of "pulling" the valve.

The standing valve is provided with a pull rod, which extends up and through the barrel of the plunger, located above the standing valve.

In the drawings illustrating the principle of my invention and the best mode now known to me of applying that principle, Figure 1 is an elevation of my new valve mechanism; Fig. 2 is a sectional elevation of the standing valve, the valve being shown seated; Fig. 3 is a detail of the valve seat; Fig. 4 is a sectional detail of the standing valve, the valve being shown at the upper limit of its stroke; Fig. 5 is a sectional detail of the lower portion of the plunger; Fig. 6 shows the packing of the plunger and the expanding devices therefor; Fig. 7 is a section on line A—A of Fig. 5; Fig. 8 is a section on line B—B of Fig. 5; and Fig. 9 is a section on line C—C of Fig. 2.

The lower part of my new valve mechanism comprises the standing valve $a$, the casing of which is made up of three parts, $b$, $c$ and $d$. The lowest part $d$ is screwed upon the lower end of the intermediate part $c$, which is formed with the shoulder $e$. Between the latter and the top of the part $d$ are interposed packing rings $f$. The upper part $b$ of the standing valve casing is screwed upon the upper end of the intermediate casing $c$; and in the latter is mounted a valve-seat, provided with an apertured disk $g$, best shown in Fig. 3. The disk $g$ is provided with the central hole $h$, and with six holes $i$, which adapt the disk to act as a strainer to intercept foreign matter. The central hole $h$ is adapted to receive the guide-pin $j$, which projects from the valve $k$. The base of the latter is rounded, but its top is flat, and is adapted to abut in its travel against the interior shoulders in the inner top portion of the casing member $b$. The position of the valve $k$ at the upper end of its travel or stroke is shown in Fig. 4. The upper casing member is formed with grooves $n$, the top portion of which extend above the flat top face of the valve $k$, when the latter is at the upper limit of its travel, as is clearly shown in Fig. 4. This construction prevents a formation of a vacuum above the valve $k$, at the upper limit of its travel or stroke, and prevents the sticking of the valve at that point. In the case of ball valves, it has been found that the valve would stick in the paraffin and other material, which gathered in the chamber or recess at the top of the upper casing; but the flat top of the valve $k$ coming in contact with the shoulders $m$ prevents the sticking of the valve $k$ by preventing it from coming in contact with the paraffin or sticky material. Furthermore, since the ball-valve would fit snugly in the upper portion of the casing, a vacuum would be produced and the air pressure upon the bottom of the ball-valve tends to hold it from becoming seated by its own weight. Further, the wear of the ball valve is uneven; but in my new valve, by reason of the provision of the central hole $h$ and the guide-pin $j$, the valve is seated in the same way each time, and wear is uniform.

The plunger $o$ is mounted above the standing valve $a$, and is fitted with the valve $k$, and the valve seat $g$, in all respects similar to the same members in the standing valve; and the top of the valve $k$ strikes against the shoulders $m$, as in the case of the standing valve and for the same purpose. The lower casing member $p$ of the plunger is screwed into the top of the tube $q$; while into the bottom of the latter screws a pipe $r$ (Figs. 5 and 6). Over the latter are slipped sleeves $s$, which are mutilated cylinders, the beveled faces $t$ of which rub against each other. Each point $u$ of the sleeve portions $s$ is cut off at a distance from the cylindrical portion $v$ of the coacting sleeve, as is best shown in Fig. 6. This permits the sleeve portions to slide upon each other without overlapping.

Upon the lower end of the pipe $r$ is screwed a socketed clutch member $w$ the base of which is formed with holes $x$ which adapts the base to act as a strainer for the exclusion of foreign matter which would tend to clog the working of the valve. Projecting downwardly from the cylindrical wall of the clutch member $w$ and integral therewith are the prongs $y$. The latter are adapted to enter the grooves $n$ formed in the upper casing member $b$ of the standing valve $a$ to lock the lower part of the plunger against rotation. The clutch member $w$ being in locking engagement with the upper casing member $b$ of the standing valve as shown in Fig. 1, suitable turning mechanism is applied to the top $z$ of the plunger $o$ and the said valve is turned, thereby causing the tube $q$ to travel upon the threaded exterior of the pipe $r$ and to force downwardly the upper sleeve member $s$. As will be understood from Fig. 6, this movement of the upper sleeve member results in forcing outwardly or expanding the packing rings 2. Hence, when these packing rings 2 become worn, it is not necessary to "pull" the valve mechanism; but by simply turning the plunger after lowering it to bring the prongs $y$ into locking engagement with the walls of the grooves $n$ in the standing valve, the packing rings are expanded to make again an air tight fit with the working barrel 3 of the well.

Should, for any reason, the tube $q$ stick fast and refuse to turn upon the pipe $r$, the latter will feed downwardly into the threaded socket of the clutch member $w$ (Fig. 5), producing the same effect by causing the mutilated sleeves $s$ to slide past each other and thereby increase the diameter of the packing rings 2.

Screwed into the top of the standing valve is a pull-rod 4 formed with an enlarged head 5 (Fig. 2). This pull-rod extends throughout the extent of the working valve and is used to pull the standing valve.

I claim:

1. In a valve mechanism, the combination of a valve casing provided with shoulders which project inwardly from its inner walls below the top of the chamber inclosed by said casing, and with openings above said shoulders; and a valve having a flattened top adapted to engage said shoulders, said openings serving to prevent the formation of a vacuum and said shoulders preventing said valve from striking the top of said chamber.

2. In a valve mechanism, the combination with a standing valve, of a plunger provided with devices for interlocking the same; packing mounted on said plunger; a pair of coacting sleeves mounted free to slide relatively to each other under said packing, said sleeves having their opposed faces beveled; and mechanism for causing one of said sleeves to move relatively to the other of said sleeves.

3. In a valve mechanism, the combination with a standing valve, of a plunger made up of a plurality of parts, one of said parts being formed with devices for interlocking with said standing valve; packing mounted between the parts of said plunger; a pipe mounted within said packing and having each of its ends connected with one of the parts of said plunger; and packing-expanding devices mounted between said pipe and packing.

4. In a valve mechanism, the combination with a standing valve, of a plunger made up of a plurality of parts, one of said parts being formed with devices for interlocking with said standing valve; packing mounted between the parts of said plunger; and a pair of sleeves mounted within said packing, said sleeves having beveled faces and having each an end opposed to an end of one of the parts of said plunger.

5. In a valve mechanism, the combination of a valve casing provided with shoulders which project inwardly from its inner walls below the top of the chamber inclosed by said casing, and with openings above said shoulders; a foraminated valve seat mounted in said casing; and a valve having a flattened top adapted to engage said shoulders; and having a rounded base from which projects a stem into one of the apertures of said valve seat; said openings serving to prevent the formation of a vacuum, and said shoulders preventing said valve from striking the top of said chamber.

6. In a valve mechanism, the combination with a standing valve, of a plunger made up of a plurality of parts, one of said parts being formed with devices for interlocking with said standing valve; packing mounted between the parts of said plunger; a pipe mounted within said packing and having each of its ends screw-threaded to engage with one of the parts of said plunger; and packing-expanding devices mounted between said pipe and packing.

In testimony whereof I hereunto set my hand in the presence of the two undersigned witnesses, at said Oil City.

EDWARD A. STUBLER.

Witnesses:
THOMAS A. ANDERTON,
NELLIE CAVANAUGH.